US006892468B2

(12) United States Patent
Murray

(10) Patent No.: US 6,892,468 B2
(45) Date of Patent: May 17, 2005

(54) RETRACTABLE RULE ASSEMBLY WITH IMPROVED BLADE OPENING

(75) Inventor: John C. Murray, Canton, CT (US)

(73) Assignee: The Stanley Works, New Britain, CT (US)

(*) Notice: Subject to any disclaimer, the term of this patent is extended or adjusted under 35 U.S.C. 154(b) by 0 days.

(21) Appl. No.: 10/417,109

(22) Filed: Apr. 17, 2003

(65) Prior Publication Data

US 2004/0205976 A1 Oct. 21, 2004

(51) Int. Cl.[7] .............................................. G01B 3/10
(52) U.S. Cl. ............................. 33/761; 33/768; 33/770
(58) Field of Search .......................... 33/755, 757, 761, 33/768, 769, 770

(56) References Cited

U.S. PATENT DOCUMENTS

| 182,356 | A | * | 9/1876 | Chesterman ................. 33/755 |
| 353,851 | A | * | 12/1886 | Fountain ..................... 33/769 |
| 1,937,866 | A | * | 12/1933 | Bertram ...................... 33/761 |
| 2,549,503 | A | * | 4/1951 | McCully ..................... 33/760 |
| 2,655,324 | A | | 10/1953 | Clark |
| 2,837,296 | A | | 6/1958 | Zelnick |
| 2,990,802 | A | * | 7/1961 | Ong et al. .................. 114/219 |
| 3,049,317 | A | | 8/1962 | Kessler |
| 3,214,836 | A | | 11/1965 | West |
| 3,482,798 | A | | 12/1969 | Kawaguchi |
| 3,869,096 | A | * | 3/1975 | Hogan et al. ................. 33/769 |
| 3,922,790 | A | * | 12/1975 | Quenot ....................... 33/767 |
| 4,102,050 | A | * | 7/1978 | Roth .......................... 33/437 |
| 4,131,244 | A | | 12/1978 | Quenot |
| 4,288,923 | A | | 9/1981 | Duda |
| 4,429,462 | A | | 2/1984 | Rutty et al. |
| 4,479,617 | A | | 10/1984 | Edwards |
| 4,972,600 | A | | 11/1990 | Nosek |
| 4,972,601 | A | | 11/1990 | Bickford et al. |
| 5,007,178 | A | | 4/1991 | Dewire et al. |
| 5,010,657 | A | | 4/1991 | Knapp |
| 5,063,686 | A | * | 11/1991 | Peloquin ..................... 33/757 |
| 5,210,956 | A | | 5/1993 | Knispel et al. |
| 6,148,534 | A | | 11/2000 | Li |
| 6,161,299 | A | | 12/2000 | Lin |
| 6,202,511 | B1 | | 3/2001 | Murray et al. |
| 6,243,964 | B1 | | 6/2001 | Murray |
| 6,249,986 | B1 | | 6/2001 | Murray |
| 6,282,808 | B1 | | 9/2001 | Murray |
| 6,324,769 | B1 | | 12/2001 | Murray |
| 6,367,161 | B1 | | 4/2002 | Murray et al. |
| 6,405,451 | B1 | * | 6/2002 | Hsu .......................... 33/767 |
| 6,449,866 | B1 | | 9/2002 | Murray |
| 6,497,050 | B1 | * | 12/2002 | Ricalde ...................... 33/770 |
| 2002/0029489 | A1 | | 3/2002 | Murray |
| 2002/0078585 | A1 | | 6/2002 | Murray |
| 2003/0029955 | A1 | * | 2/2003 | Hsu .......................... 33/761 |

* cited by examiner

Primary Examiner—Christopher W. Fulton
Assistant Examiner—Travis Reis
(74) Attorney, Agent, or Firm—Pillsbury Winthrop LLP

(57) ABSTRACT

A retractable rule assembly includes wear resistant structure formed of a wear resistant material. The wear resistant structure is mounted at each lateral side of a blade opening of the rule assembly's housing to substantially protect the plastics material at the lateral sides from wear by the lateral side edges of the blade. An alternative retractable rule assembly has rollers rotatably mounted at each lateral side of the blade opening.

27 Claims, 14 Drawing Sheets

RETRACTABLE RULE ASSEMBLY WITH IMPROVED BLADE OPENING

FIELD OF THE INVENTION

The present invention relates to retractable rule assemblies.

BACKGROUND OF THE INVENTION

FIG. 1 illustrates the blade opening of a prior art retractable rule assembly wherein the housing is formed of a plastics material. The rule assembly is generally indicated at 300 and the housing is generally indicated at 302. The housing 302 includes a blade opening 304 through which an elongated metal blade extends. The blade is not shown for purposes of clearly showing the blade opening 304. A spring-driven reel 306 is mounted in the housing 302 and the blade is wound thereon with its extended portion extending through the blade opening 304. During use of the rule assembly, the blade is extended from the reel 306 through the blade opening 304 for purposes of taking measurements, and then is retracted automatically by the spring driving the reel 306. During the repeated usage over time, the lateral side edges of the blade can come into contact with the lateral side edges of the opening 304, particularly during retraction by the spring. Because the spring retracts the blade at a relatively high speed, and the blade is formed from a metal, which is significantly harder than the plastics material of the housing 302, the blade's lateral side edges can wear grooves 308 into the plastics material at the lateral side edges of the opening 304.

As shown in FIG. 1, these grooves can become relatively deep over time. Specifically, the blade initially forms a slight groove during its initial usage, and over time the blade tends to "find" this groove and repeatedly wear the same groove to increased depth, rather than uniformly wearing the entire height of the lateral sides edge. As an analogy, this can be compared with the manner in which one cuts lumber with a saw—first the user moves the saw over the edge of the uncut lumber to form an initial groove, and then can cut freely with more power because the initial groove will guide the saw as the cutting depth increases.

This formation of grooves 308 can be problematic for a number of reasons. For example, as the blade rides in a formed groove 308, the measuring indicia on the blade edges can be worn off by the upper surface of the grooves, which makes it difficult to take proper measurements. Also, as the blade rides in the groove, friction is created, which provides additional resistance to blade retraction. To offset this additional resistance, a larger more powerful spring may be needed, which adds cost. In addition, these grooves 308 can create "fulcrum points" about which the extended portion of the blade can bend sharply during retraction. Specifically, in some rule assemblies the blade opening is designed to be vertically higher than the blade itself to accommodate some vertical movement of the blade to minimize the chances of sharp bends in the blade as it retracts. However, when the blade rides in a groove 308, the groove 308 prevents such vertical movement of the blade, and thus can create a point about which sharp bends occur. Sharp bending of the blade is undesirable, because over time it can lead to blade fatigue and failure.

SUMMARY OF THE INVENTION

The present invention provides solutions to protect the lateral side edges of the blade opening from wear.

One aspect of the present invention provides a retractable rule assembly comprising a housing having a blade opening, the blade opening having two lateral sides provided by a plastics material having a hardness; and a reel rotatably mounted in the housing. An elongated blade is formed of a ribbon of metal having a pair of opposing lateral side edges. The blade is extendable outwardly through the blade opening of the housing with the lateral side edges thereof adjacent the lateral side edges of the opening. The blade has a concavo-convex cross-sectional configuration when extended from the housing and also has measuring indicia on the concave side thereof. A spring is constructed to rotate the reel in the housing in a direction to wind up the elongated blade onto the reel in a flattened cross-sectional configuration. The rule assembly of this aspect of the invention also comprises wear resistant structure comprising a wear resistant material having a hardness greater than the hardness of the plastics material. The wear resistant structure is located at least at each of the lateral sides of the blade opening to substantially protect the plastics material at the opening's later sides from wear by the lateral side edges of the blade.

Another aspect of the invention provides a retractable rule assembly comprising a housing having a blade opening, the blade opening having two lateral sides provided by a plastics material; and a reel rotatably mounted in the housing. An elongated blade is formed of a ribbon of metal having a pair of opposing lateral side edges. The blade is wound on the reel and is extendable outwardly through the blade opening of the housing with the lateral side edges thereof adjacent the lateral sides of the opening. The blade has a concavo-convex cross-sectional configuration when extended from the housing and also has measuring indicia on the concave side thereof. A spring is constructed to rotate the reel in the housing in a direction to wind up the elongated blade onto the reel in a flattened cross-sectional configuration. This rule assembly of this aspect of the invention also comprises wear resistant structure comprising metal. The wear resistant structure is located at least at each of the lateral side edges of the blade opening to substantially protect the plastics material at the opening's lateral sides from wear by the lateral side edges of the blade.

Another aspect of the invention provides a retractable rule assembly comprising a housing having a blade opening having two lateral sides provided by a plastics material and a reel rotatably mounted in the housing. An elongated blade is formed of a ribbon of metal having a pair of opposing lateral side edges. The blade is extendable outwardly through the blade opening with the lateral side edge thereof adjacent the lateral sides of the opening. The blade has a concavo-convex cross-sectional configuration when extended from the housing and has measuring indicia on the concave side thereof. A spring is constructed to rotate the reel in the housing in a direction to wind up the elongated blade onto the reel in a flattened cross-sectional configuration. Rollers are rotatably mounted at least at each of the lateral sides of the blade opening to substantially protect the plastics material thereat from wear by the lateral side edges of the blade.

Other objects, features, and advantages of the present invention will become apparent from the following detailed description, the accompanying drawings, and the appended claims.

DETAILED DESCRIPTION OF THE ILLUSTRATED EMBODIMENT

Figure 1:
FIG. 1 is a front close-up view of a blade opening in a prior art rule assembly.
Figure 2:
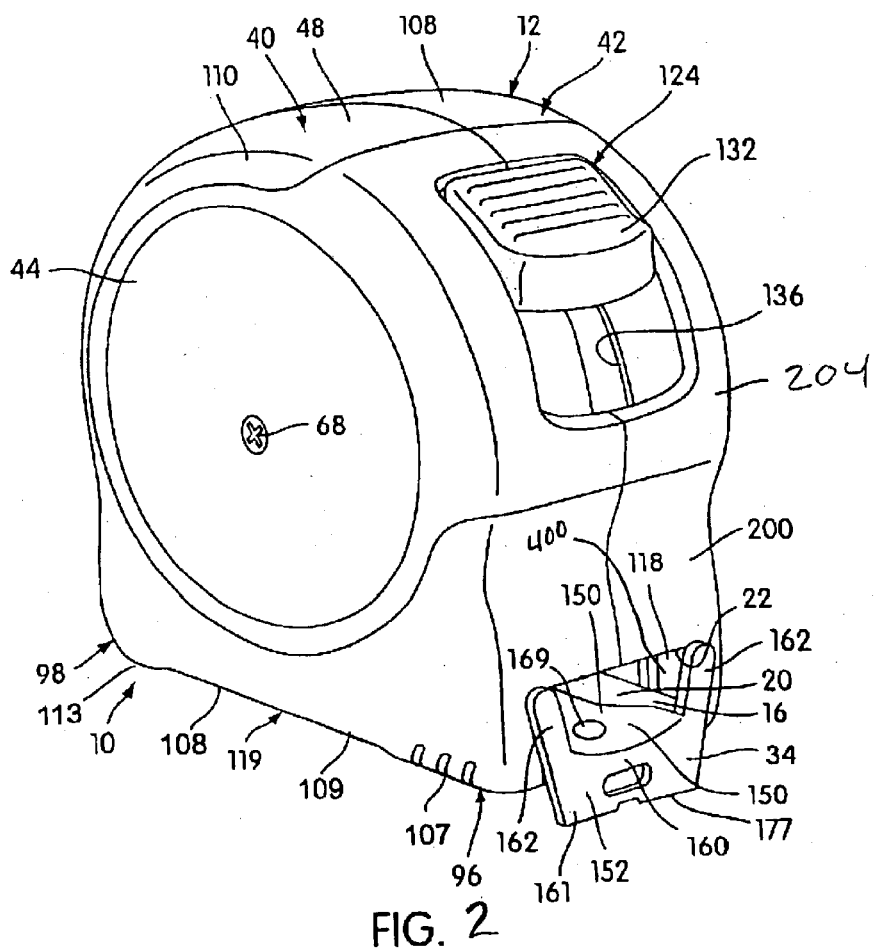
FIG. 2 is front perspective view of a rule assembly constructed in accordance with the present invention.
Figure 3:
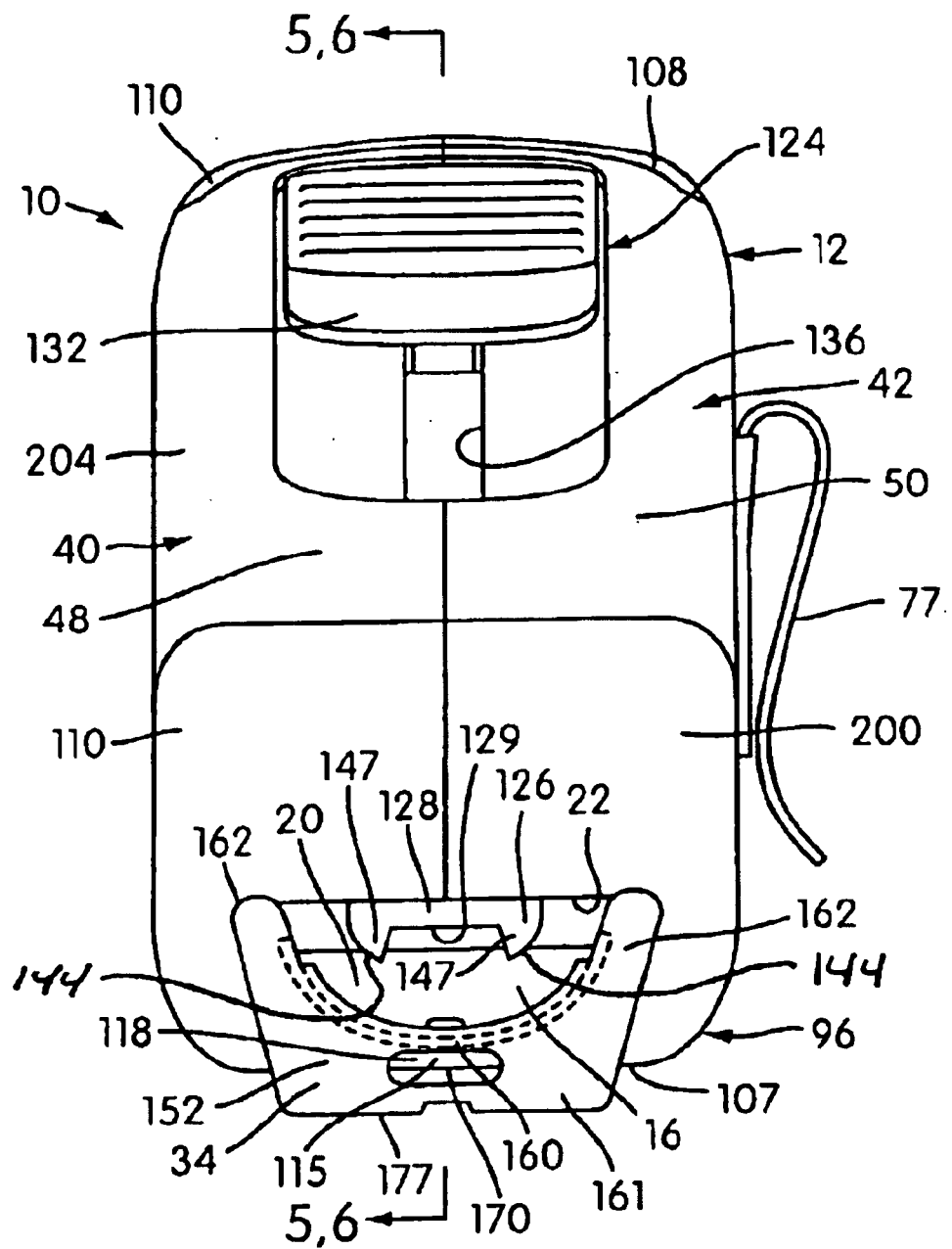
FIG. 3 is a front elevated view of the rule assembly of FIG. 2.
Figure 4:
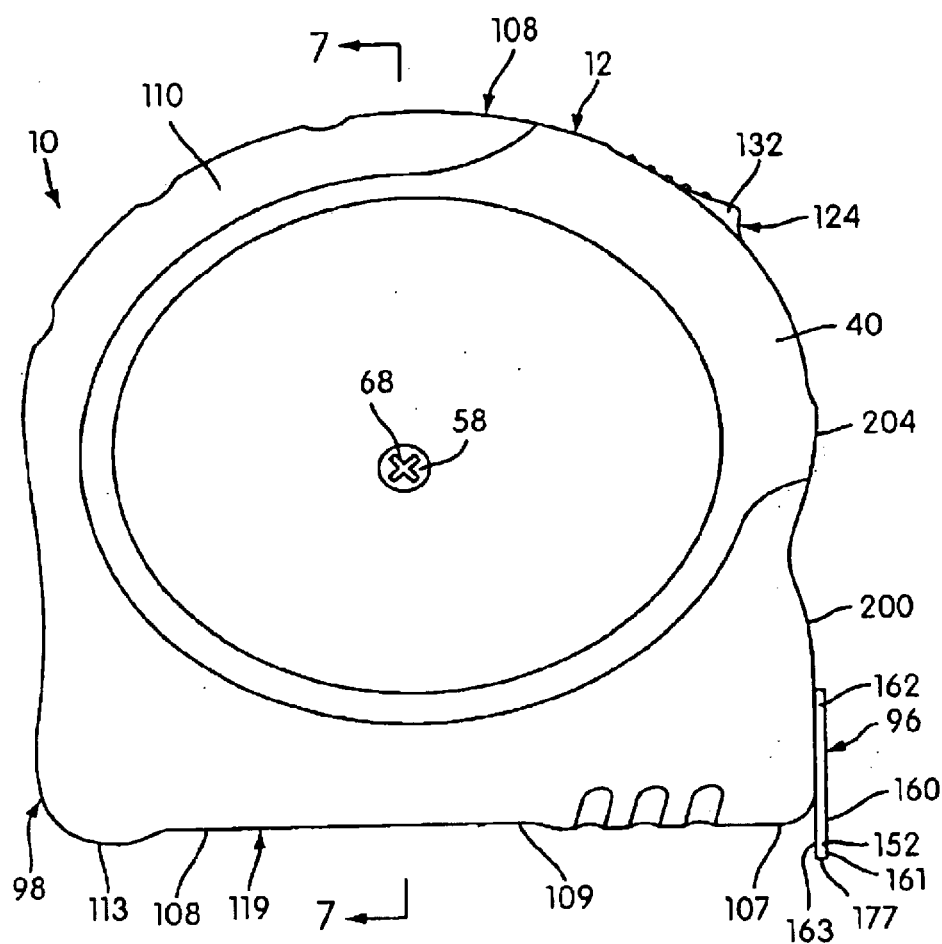
FIG. 4 is a profile view of the rule assembly of FIG. 2.
Figure 5:
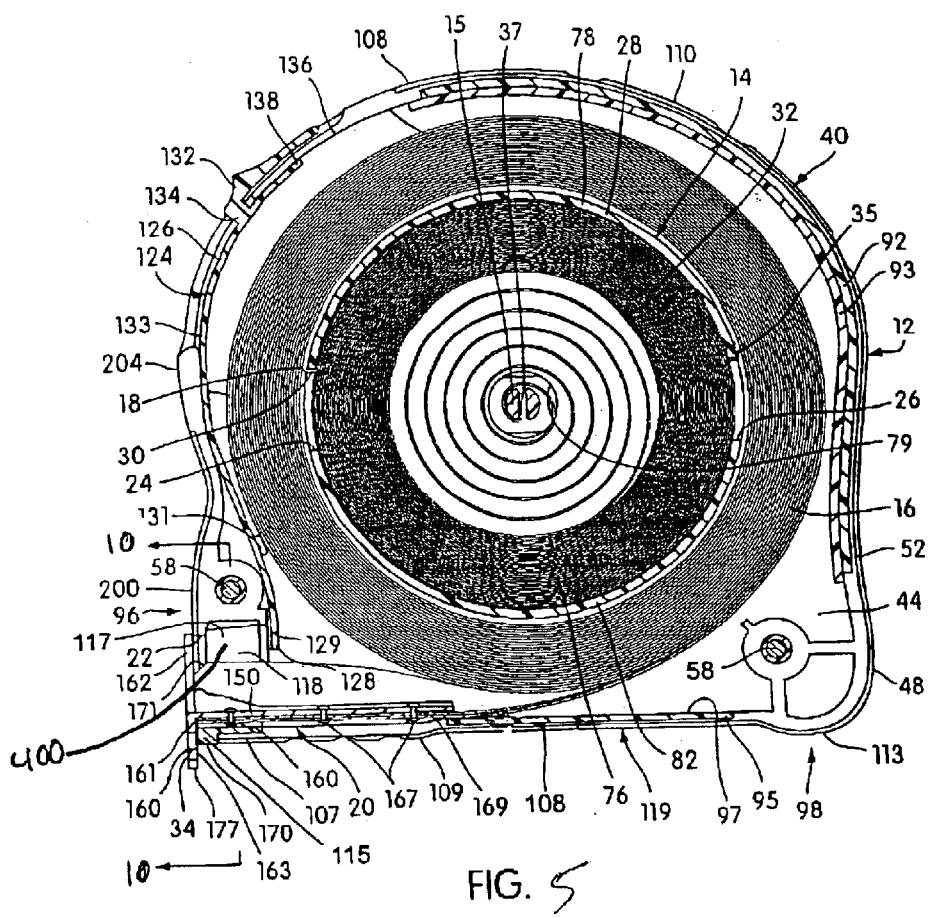
FIG. 5 is a cross-sectional view taken along line 5,6—5,6 of FIG. 3 with the blade fully retracted.
Figure 6:
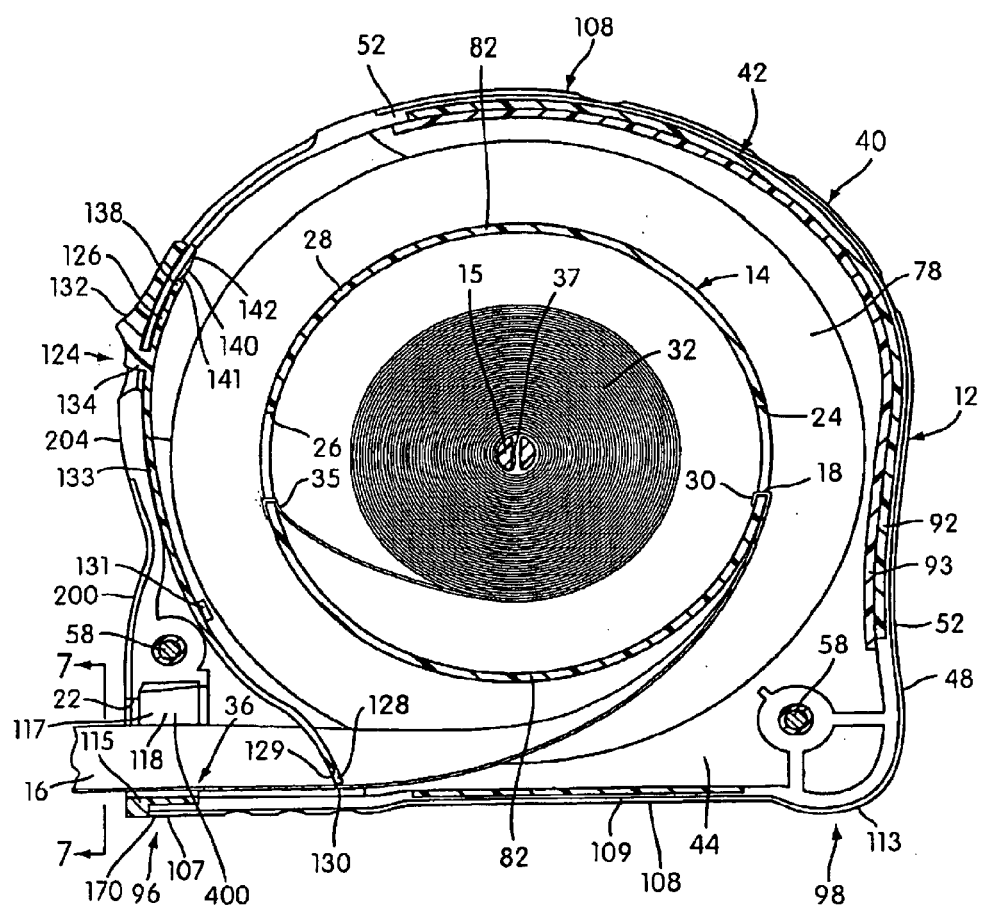
FIG. 6 is a cross-sectional view taken along line 5,6—5,6 of FIG. 3 with the blade fully extended.
Figure 7:
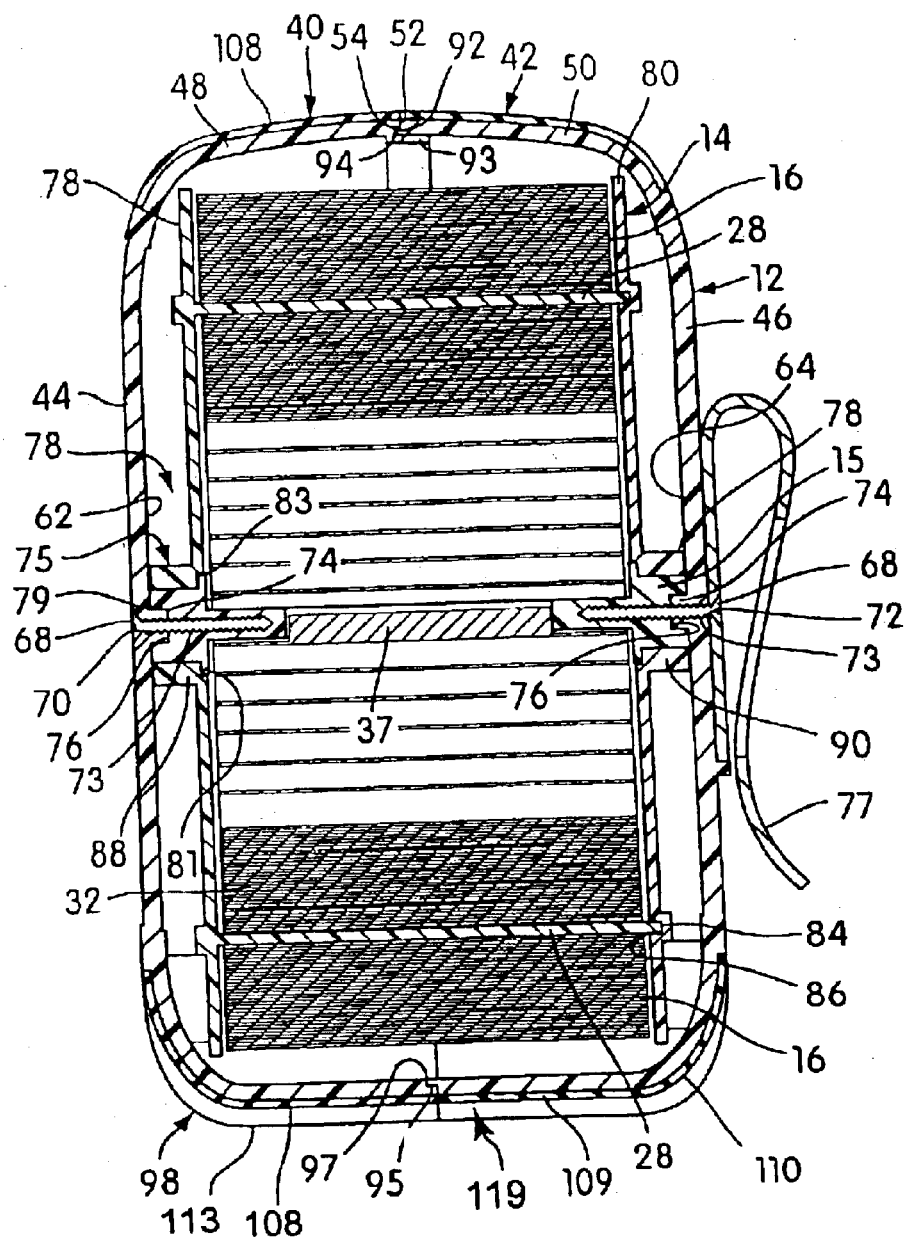
FIG. 7 is a cross-sectional view taken along line 7—7 of FIG. 4.

FIGS. 2–4 show an exterior view of a retractable rule assembly that is generally designated 10 and is constructed according to the principles of the present invention. The rule assembly 10 includes a housing assembly 12 and a reel 14 that is rotatably mounted inside the housing assembly 12 (best seen in the cross-sectional views of FIGS. 5–7). The reel 14 is mounted in the housing assembly 12 by a reel spindle 15 that is secured within the housing assembly 12 (FIGS. 5–7). An elongated tape rule blade 16 is mounted on the reel 14.

The blade 16 is formed of a ribbon of metal, the preferred metal being steel, and the top concave surface of the blade is printed with measuring indicia in the form of measuring lines and digits (not shown) for measuring lengths and distances. One longitudinal end 18 of the blade 16 is connected to the reel 14 or spring 32 and a second longitudinal free end 20 of the blade 16 extends generally outwardly of the reel 14. The blade 16 is extendible generally from a position tangential of the reel 14 outwardly through a blade opening 22 provided in the housing assembly 12 (as shown, for example, in FIG. 5).

The reel 14 may be made of a molded plastic and is provided with slots or openings 24, 26 in a central cylindrical wall portion 28 thereof. The one end 18 of the blade terminates in a hook-like structure 30 that connects to the spring 32 or that hookingly engages an edge of the wall portion 28 of the reel 14 at opening 24 to connect the end 18 of the blade 16 (FIGS. 5 and 6). The construction of the reel 14 is not essential and any configuration or construction may be used.

A coil spring 32 is connected between the housing assembly 12 and the reel 14 to rotate the reel 14 with respect to the housing assembly 12 in a direction to wind the elongated blade 16 about the reel when the blade 16 is extending outwardly of the blade opening 22. The coil spring 32 is generally enclosed within the central wall portion 28 of the reel 14 (FIGS. 5–7). One longitudinal end 35 of the coil spring 32 connects to the blade 16 or hookingly engages an edge of the wall portion 28 of the reel 14 that defines the opening 26; a second longitudinal end 37 of the blade 16 hookingly engages the spindle 15. The spindle 15 is rigidly mounted to the housing assembly 12 in a manner considered in detail below. Preferably the spring 32 is a thin, flat ribbon of metal, the preferred metal being steel. The construction of the spring 32 and the manner in which it is connected between the reel 14 and the housing 12 are not essential and any construction or configuration may be used.

The blade 16 is generally movable between a fully retracted position within the housing assembly 12 and a fully extended position. The fully retracted position of the blade 16 is shown in FIG. 5 and the fully extended position of the blade is shown in (in fragmentary view) in FIG. 6. It can be appreciated from a comparison of FIG. 5 and FIG. 6 that as the blade is unwound from the reel 14, the coil spring 32 is wound around the rigidly fixed spindle 15. This winding of the spring around the spindle stores energy in the spring to provide spring powered rewinding of the blade 16 around the reel 14 when the extended blade is released.

Figure 9:
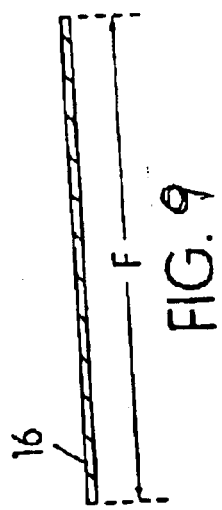
FIG. 9 is a sectional view of the blade in its flattened configuration.
Figure 8:
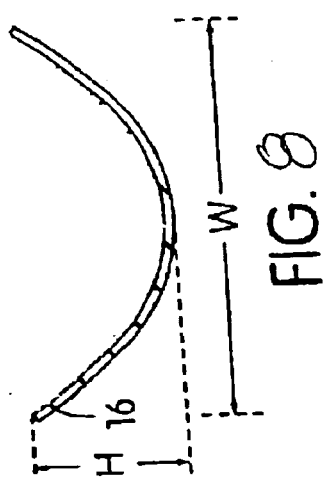
FIG. 8 is a sectional view of the blade in its concavo-convex configuration.

The blade 16 is constructed of a ribbon of sheet metal that is shaped during the manufacturing to have a normal or memory configuration that has a generally arcuate or concavo-convex transverse cross-section. When a portion of the blade 16 is wound about the reel 14, the wound portion has a flat transverse cross-section (FIGS. 7 and 9) and the wound layers of the coiled blade provide the wound blade with an abutting volute coil configuration. A representative transverse cross-section of the extended blade 16 showing its concavo-convex configuration is illustrated in FIG. 8. It can therefore be understood from a comparison of FIGS. 5 and 6 (and from a comparison of FIGS. 8 and 9) that when the blade 16 is wound around the reel 14, it has the flat cross-section of FIG. 9 and when the blade 16 is withdrawn from the housing assembly 12 to measure an object, it returns to the concavo-convex cross-section shown in FIG. 8. The concavo-convex cross-section provides the extended blade with rigidity and maintains the blade essentially straight in the longitudinal direction.

The housing assembly 12 is further constructed to easily and comfortably fit in a hand of the user. The details of the internal structure of the housing assembly 12 and the blade 16 mounted therein are shown in FIGS. 5–7 and 10. Preferably the housing assembly 12 and the reel 14 are constructed of a molded plastics material. As best appreciated from FIG. 7, the housing assembly 12 includes a pair of cooperating molded plastic housing members 40, 42. Each housing member 40, 42 includes an end wall 44, 46, respectively, having a peripheral wall 48, 50, respectively, extending from a periphery thereof and terminating in a free edge 52, 54, respectively. The pair of cooperating housing members 40, 42 are movable toward one another in an axial direction into cooperating relation to define the housing assembly (where "axial direction" refers to the direction of the axis of rotation of the reel defined by the spindle).

When the housing members 40, 42 are fixed together in the assembled rule assembly 10, the free edges 52, 54 are interengaged as shown in FIG. 7. A plurality of axially extending bolts 58 extend through one of the housing members 42 and threadedly engage the other housing member 40 (FIG. 10) at spaced positions adjacent the peripheral walls 48, 50. The housing members 40, 42 are also fixed together by the threaded engagement of bolts 68 or other types of fasteners with the fixed reel spindle 15. The axially extending spindle 15 is fixed at a central portion of the housing assembly 12. Specifically, the fixed spindle 15 has a noncircular interengaging recess-projection connection (shown in FIG. 7 and described below) at each end thereof for connecting it to central interior regions 62, 64, respectively, of the end walls 44, 46 of the housing assembly 12. Each end of the fixed spindle 15 is interiorly threaded to threadedly receive the bolts 68 therein. The bolts 68 extend through central holes 70, 72 formed in the respective adjacent end walls 44, 46 of the housing assembly and threadedly engage internal threading 73 in each end of the spindle 15. Each bolt 68 extends through a recess-projection connection, generally designated 75, when each bolt 68 is disposed in a respective central hole 70, 72 and threaded interior 73. A metal clip 77 is secured to one side of the housing assembly by one of the bolts 68.

Preferably, the fixed spindle 15 is constructed of a molded plastics material, such as nylon. The construction of the recess-projection connections 75 between the ends of the spindle 15 and the walls 44, 46 is shown in cross-section in FIG. 6. Each recess-projection connection 75 is identical. Specifically, projections 74 having exterior noncircular cross-sections are integrally formed on the walls 44, 46 and are received within recesses 76 having complementary noncircular interior cross-sections formed on each end of the spindle 15. The noncircular interior and exterior cross-sections cooperate to prevent rotation of the spindle 15 with respect to the housing assembly 12 when the ends of the spindle 15 are mounted on the projections 74 in the assembled rule assembly 10. Each end of the spindle 15 extends through a hole 79 of circular cross-section formed in opposite sides of the reel 14. The portions of the spindle 15 that extend through the holes 79 in the reel 14 have circular exterior cross sections. A flange 81 on the spindle 15 engages an annular groove 83 in the reel 14 surrounding the hole 79 to guide the rotation of the reel on the spindle. Thus, the reel 14 is rotatably mounted on the spindle 15 for bi-directional rotational movement of the reel with respect to the housing assembly 12. As can best be appreciated from FIGS. 5 and 7, the spindle 15 is internally slotted to receive the one longitudinal end 37 of the spring 32 to thereby secure the one end 37 of the spring to the spindle. The manner in which the spindle 15 and/or the reel 14 are mounted in the housing 12 are not essential and any suitable construction or configuration may be used.

The molded plastic reel 14 includes two reel members 78, 80 (FIG. 7). Reel member 78 includes the integral cylindrical wall portion 28 about which the blade 12 is wound. Reel member 80 is essentially disk shaped. Each reel member 78, 80 includes an outwardly extending cylindrical wall portion 88, 90, respectively, formed around the hole 79. An annular edge portion 84 on the wall portion 82 is received within an annular groove 86 formed within reel member 80 to help hold the reel 14 together. The abutting engagement of the wall portions 88, 90 on the reel with the end walls 44, 46 of the housing assembly 12 maintain the edge portion 84 within the groove 86 in the assembled rule assembly.

The housing members 40, 42 include portions along the abutting free edges thereof 52, 54, respectively, of tongue and groove construction (FIG. 7) to help secure the molded housing members 40, 42 of the assembled rule assembly 10 together. Specifically, at a top portion of the housing assembly 12, a wall portion 92 formed on edge 54 is received within a groove 94 formed along a portion of the edge 52; and an integral wall portion 93 formed on edge 52 is disposed in underlying, abutting relation to wall portion 50 of the housing member 42. At a bottom portion of the housing assembly 12, a wall portion 95 formed along a length of edge 54 is received within a recess 97 formed on a portion of the wall portion 48 of housing member 40.

When viewed from the side elevational view, the housing assembly 12 includes only two corner portions (see FIG. 5, for example), generally designated 96, 98. One corner 96 is adjacent the housing assembly opening 22 and the other corner portion 98 is at an opposite bottom end of the housing assembly 12. The two bolts 58 are positioned in the only two corner portions 96, 98, respectively, of the housing assembly 12. Thus, it can be appreciated that the housing assembly 12 is secured together using threaded fasteners in only three locations (from the point of view of one looking at the side elevational view of, for example, FIG. 5): at the opposite corners 96, 98 (bolts 58) at the bottom portion of the housing assembly 12 and in the center of the housing assembly 12 (bolts 68). This use of the bolts 68 on opposite ends of the reel spindle 15 allows the housing assembly 12 to be secured together without using any bolts in a peripheral top portion or portions of the housing assembly 12. The manner in which the housing member 40, 42 are connected together is not essential and any suitable construction may be used.

A peripheral portion of housing assembly 12 is provided with a rubber-like coating 110 around the gripped portion of the housing assembly 12 to provide increased frictional engagement between the housing assembly and a user's hand and to provide a relatively soft comfortable surface for the user's hand. The presence of the rubber-like coating 110 is only preferred and not considered essential.

The housing assembly 12 includes a bottom wall 109 (FIGS. 5 and 6) having an exterior portion 107 at an end position adjacent the housing assembly opening 22 which projects below an exterior surface portion 108 extending therefrom toward an opposite end 113 of the bottom wall 109 to provide a finger grip enhancing configuration, generally designated 119 for a gripping hand of the user. More specifically, the bottom wall 109 (FIGS. 4 and 5) has a forward end portion 107 adjacent the blade opening 22 and a rearward end portion 113 at the opposite end of the bottom wall 109; the portion 108 of the wall 109 therebetween is generally recessed to provide the finger grip enhancing configuration 119 for the gripping hand of the user. This recessed area or gripping area 119 on the bottom of the housing assembly 12 is preferably completely covered with the overmolded rubber or rubber-like polymeric material. It can thus be appreciated that the housing assembly 12 is constructed to be easily held in one hand of a user such that the user's fingers engage the finger grip enhancing portion 119 and the user's palm and thumb are generally in overlying relation with a top portion of the housing assembly.

The housing assembly includes an insert 118 (FIG. 10) that forms a part of the blade opening 22 adjacent a convex side of the blade 16. The insert 118 is an essentially U-shaped structure having a transversely extending cross member 115 and two upstanding arms 117 extending upwardly from opposite sides of the cross member 115. The cross member 115 defines the lower edge of the housing opening; a bottom surface 170 of the cross member 115 is flush with the adjacent surface portion 107 of the bottom wall 109 so that a bottom surface portion 170 of the insert 118 forms part of the bottom surface of the housing assembly 12 adjacent the opening 22 (FIGS. 5 and 6). The insert 118 is preferably an integral molded plastic structure and includes wear resistant structure that will be discussed below.

The insert 118 is held within appropriately sized opposing recesses 121, 123 (FIG. 10) formed in the respective housing members 40, 42. These recesses 121, 123 are disposed on opposite sides of the opening 22 when the housing members 40, 42 are secured together. The cross member 115 of the insert 118 has a plurality of tangentially extending, transversely spaced elongated ridges 120 which define surfaces 125 along the bottom of the opening 22 for engaging and supporting the convex side of the blade 16 extending tangentially from the reel 14 of the housing assembly opening 22. Thus, the ridges 120 slidably engage the convex side of the blade 16 and provide a low friction engagement between the housing assembly 12 and blade 16.

The insert 118 includes wear resistant structure formed of a wear resistant material having a hardness greater than the hardness of the plastics material of either the housing 12 or the insert 1 8. Particularly, the wear resistant material is substantially harder than the plastics material of the insert 118 defining the lateral sides of the blade opening 22. In the illustrated embodiment, the wear resistant structure is provided by a pair of metal plates 400 mounted on the interior surfaces of the upstanding arms 117 of the insert 118. The presence of these metal plates 400 substantially protects the plastics material at the lateral sides of the blade opening 22 from wear from the lateral side edges of the blade 16 during extending and retracting movement thereof.

Figure 11:
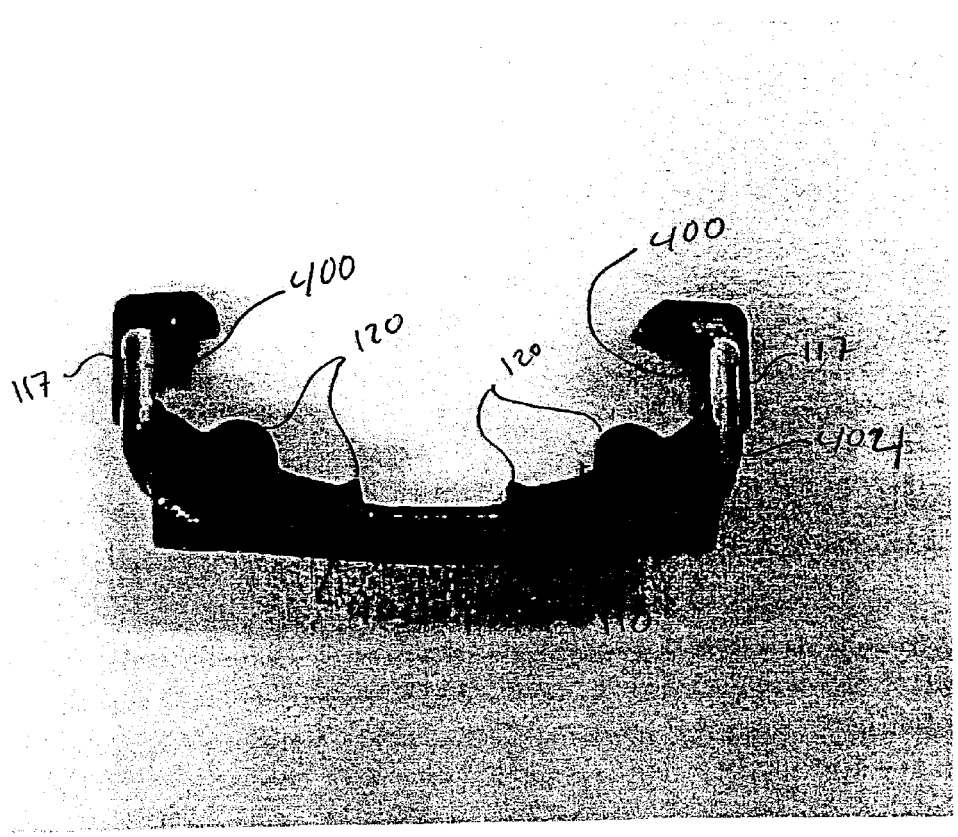
FIG. 11 is a front elevated view of the insert mounted in the blade opening.
Figure 12:
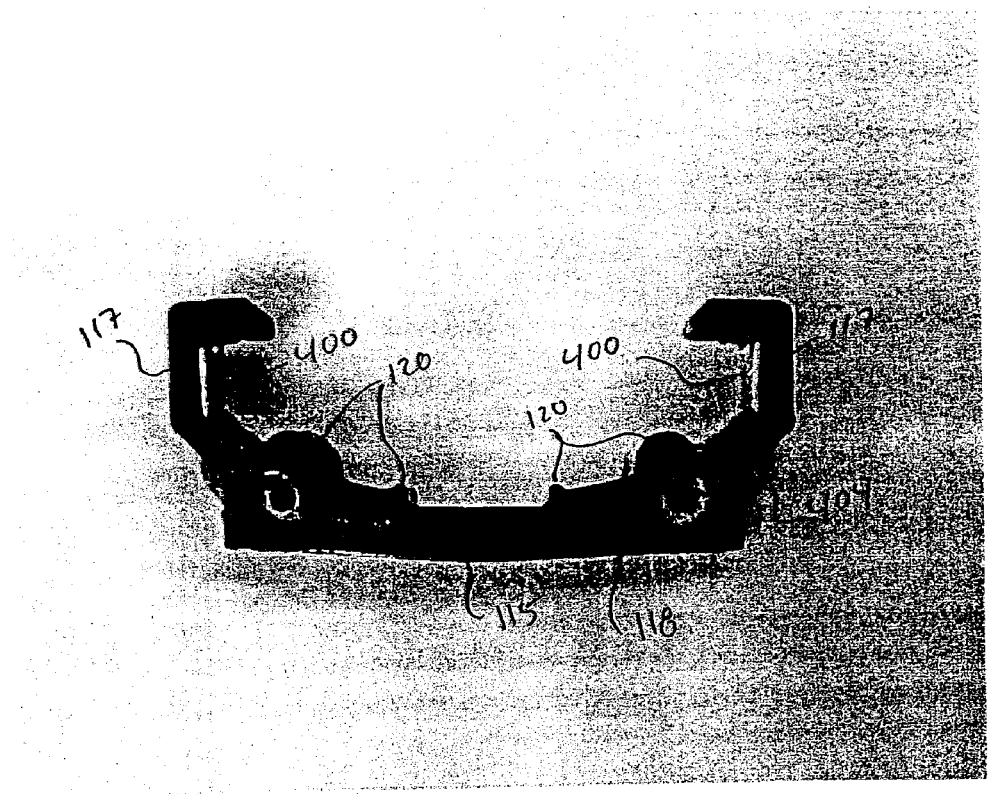
FIG. 12 is a rear elevated view of the insert mounted in the blade opening.
Figure 13:
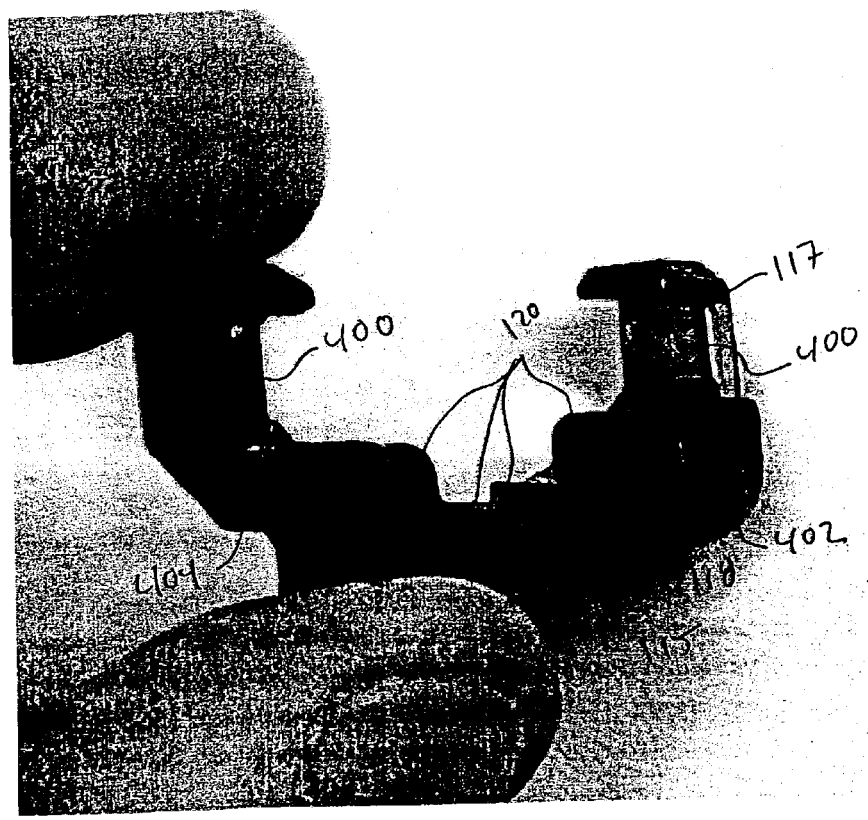
FIG. 13 is a perspective view of the insert taken from the front thereof.

In the illustrated embodiment, the insert 118 includes a main body portion 402 formed of the plastics material and the plates 400 are mounted to the body portion 402. As can be seen in FIG. 11-13, which show various views of the insert 118, the plates are part of a single piece of metal 404 that is attached to the main body portion 402 by overmolding. Any other suitable method of attachment may be used. Alternatively, the wear resistant structure could be provided by two pieces of metal, with one piece of metal being located on one lateral side of the blade opening 22, and the other piece of metal being located on the other side of the opening 22.

The illustrated embodiment of the wear resistant structure and its mounting in the blade opening 22 is only for illustrative purposes and is not intended to be limiting. Other alternative constructions and materials are envisioned. For example, the wear resistant structure may be formed of a material other than metal, such as a high hardness plastic or a plastic with a hard low friction coating. Also, the wear resistant structure could comprise both metal and plastic, such as a plastic with a metal coating (e.g., titanium oxide). The insert 118 could also entirely be formed of the wear resistant material, thus avoiding the need for separately attaching a wear resistant structure to it. Also, the blade opening could be defined entirely by the main body of the housing 12, with the wear resistant structure being mounted at the lateral sides of the blade opening to protect the housing's plastics material. Likewise, the insert 118 could define only the bottom portion of the blade opening 22 and the wear resistant structure could protect the lateral side edges of the opening 22 defined by the main housing portion. Further, the insert 118 could surround the entire blade opening 22 (i.e., it could provide the top, bottom, and side surfaces) and be formed entirely of the wear resistant material, or have wear resistant material attached to it at appropriate places.

Figure 14:
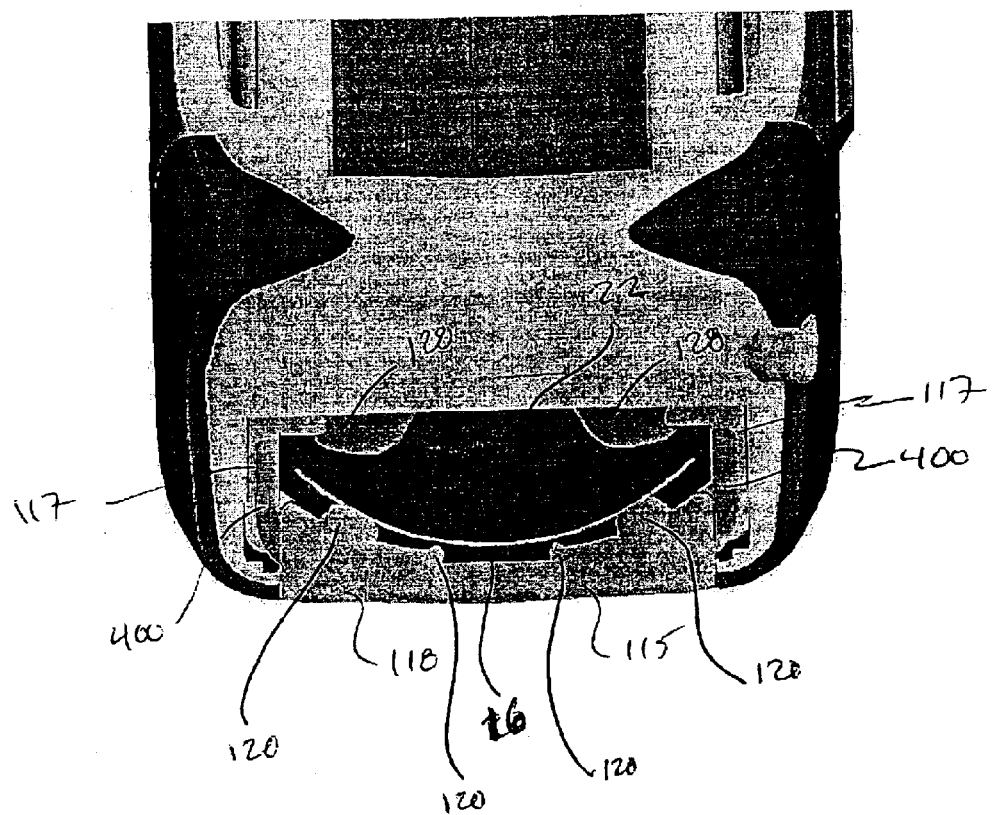
FIG. 14 is a front elevated view of an alternative rule assembly.

As an alternative, the wear resistant structure could also be provided at the upper and lower sides of the blade opening 22 to protect those areas from where. Also, the wear resistant structure could be extended to or otherwise provided on the front surfaces of the insert 118 or the housing so that those areas, and particularly their corners at the blade opening 22, such as may be caused by whipping of the blade during high speed retraction, is minimized or prevented. An example of this is shown in the alternative embodiment of FIG. 14, where the plates 400 (discussed below) extend around to the front of insert 118.

A holding assembly, generally designated to 124, is constructed and arranged to be manually actuated to hold the blade 16 in any position of extension outwardly of the housing assembly opening 22 and to release the blade 16 from any position in which it is held. The structure and operation of the holding assembly 124 is best appreciated from a comparison of FIGS. 5 and 6. The holding assembly 124 includes a holding member 126 mounted on the housing assembly 12 for movement in opposite directions between a normally inoperative position (FIG. 5) and a holding position (FIG. 6). The blade holding member 126 is an arcuate member that is movable along an arcuate path between the two positions as aforesaid. The holding member 126 has an interior free end portion 128 that is movable into wedging engagement with the tangentially extending portion of the blade 16 to engage and hold the blade against an interior holding structure 130 (FIG. 6) on the housing assembly 12 when the holding member 126 is in its holding position. The free end portion 128 includes a central recess 129 (FIG. 3, for example) that is described in detail below. The holding member 126 has an exterior thumb engaging portion 132 configured to be moved digitally to selectively move the holding member 126 from its normally inoperative position and its holding position. The exterior thumb engaging portion 132 is best seen in FIGS. 2 and 3.

Preferably, the holding member 126 is an integral structure made of an appropriate durable flexible plastic. The thumb engaging portion 132 is connected by an integral outwardly extending neck portion 134 to an elongated arcuate flexible body portion 133 that terminates in the interior free end 128. The outwardly extending portion 134 is slidably held within and guided by a slot 136 formed within a front part of housing assembly 12 by the members 40, 42. The movement of a lower portion of the holding member 126 is guided by a pair of tabs 131 integrally formed on respective housing members 40, 42 (only one tab is shown in the figures). An integral locking structure 138 on the holding member 126 engages holding structure 140 (FIG. 6) integrally formed on the housing assembly 12 to releasably lock the holding member 126 in the holding position in wedging engagement with the blade 16.

More specifically, to lock the blade 16 in a given position of extension, the user (while holding the blade 16 outwardly of the housing assembly 12 against the spring force of the coil spring 32) slides the thumb engaging portion 132 downwardly with respect to the housing assembly 12. This causes the locking structure 138 to slide over a ramped surface 142 on the holding structure 140 and also causes the free end 128 to move in a locking direction with respect to the blade 16. The flexible plastic locking structure 138 bends resiliently outwardly slightly as it passes over the holding structure 140. After the free end 128 contacts the blade 16, continued movement of the thumb engaging portion 132 in the locking (downward) direction thereafter wedges the free end 128 of the flexible body portion 133 against blade 16. This holds the blade 16 in place against the spring force of the coil spring 32 and moves the locking structure 138 into abutting engagement with a locking surface 141 on the holding structure 140. The holding member flexes slightly as the free end 128 is wedged against the blade 16. The abutting engagement between the locking structure 138 and the locking surface 141 locks the holding member 126 in its holding position. It can be understood from FIG. 6 that the blade 16 is held in an extended position (against the spring force of the coil spring 32) between the free end 128 of the body portion 133 and the interior holding structure 130 by the downward force exerted by the wedged body portion 133. The interior holding structure 130 (not visible in detail) is a series of longitudinally spaced, transversely extending ribs that are constructed and arranged to support the convex side of the blade 16. When viewed from the point of view of FIG. 6 (i.e., on a transversely directed line of sight), the top surfaces (not visible in the Figures) of the ribs cooperate to provide a generally downwardly sloped support (in a direction toward the opening 22) for the blade 16; and when viewed from the front, (i.e., on a longitudinally directed line of sight) the top surfaces (not visible in the figures) of each rib of the interior holding structure 130 are transversely spaced in a concave array to receive and support the convex side of the blade.

To release the blade 16, the user pulls upwardly on the thumb engaging portion 132 which causes the locking structure 138 on the plastic holding member 126 to move resiliently outwardly and past the locking surface 141 to release the holding member 126 from engagement with a blade 16. The holding member 126 resiliently returns to its normal arcuate shape. It can be appreciated from FIG. 3 that the recess 129 on the free end 128 of the holding member 126 defines two transversely spaced teeth 147 which have spaced arcuate side surfaces 144 sized to conform to the concave surface of the blade 16 to hold the same in locked position.

The use of the holding member 126 when a measurement is being taken is optional. When taking a measurement, the user typically holds the housing assembly 12 in one hand and manually pulls the blade 16 out of the housing assembly 12 with the other hand. When a sufficient length of blade 16 has been withdrawn from the housing assembly 12, the user can lock the blade 16 with respect to the housing assembly 12 using the holding member 126 to prevent the blade 16 from retracting back into the housing assembly 12 (under the spring force of spring 32) when the user releases the blade 12. When the measurement has been taken, the user simply releases the holding member 126 from holding engagement with the blade 16 by moving the free end 128 thereof out of wedging engagement with the blade 16 in the manner described above. If the holding member 126 is not used during the taking of a measurement, the user can simply hold the blade 16 with his other hand while the measurement is being taken or, alternatively, the hook member 34 can be placed in hooking engagement with the workpiece to hold the blade 16 outwardly of the housing assembly 12 in a controlled and steady manner against the spring force of spring 32 while the measurement is being taken.

The particular construction of the blade holding assembly 124 and its presence is not critical and any construction may be used.

The construction of the hook member 34 and the manner in which it is disposed on the free end 20 of the blade 16 is best seen in FIGS. 2-5, and 10. Preferably the end hook member 34 is formed of sheet metal of predetermined thickness and includes a concavo-convex mounting portion 150 (FIG. 10) having a U-shaped hook portion 152 bent at a generally right angle from an end of the concavo-convex mounting portion 150. The hook member 34 is mounted on the free end 20 of the blade 16 with the mounting portion 150 thereof secured in limited sliding engagement with a concave side of the free end 20 of the blade 16 and in overlying relation thereto.

More specifically, the mounting portion 150 is provided with large holes 167 (FIG. 5) and a plurality of rivets 169 extend through the holes 167 to slidably mount the hook member 34 to the blade 16 for limited longitudinal relative movement between the hook member 34 and the blade 16 (i.e., the diameter of each hole 167 is greater than the diameter of the associated rivet 169 by an amount approximately equal to the desired amount of hook movement). The limited sliding engagement allows the blade 16 to be measured externally from an external surface 161 of the U-shaped hook portion or internally from an internal surface 163 of the U-shaped hook portion 152. In other words, the sliding movement of the hook member 34 allows an accurate measurement to be taken with either surface 161 or 163 in abutting relation with the workpiece; the holding member 34 slides longitudinally with respect to the blade 16 a distance approximately equal to the thickness of the hook portion 152 (where the thickness is measured from surface 161 to surface 163) so that a measurement taken with either surface 161 or 163 in abutting engagement with the workpiece will yield an accurate measurement.

The U-shaped hook portion 152 includes a bight section 160 extending transversely downwardly from a convex side of the free end of the blade 16 and spaced leg sections 162 extending beyond transversely spaced corners 171 of the free end of the blade. The bight section 160 of the hook portion 152 of the hook member 34 provides an under-catch structure that can hookingly engage a workpiece to facilitate extension of the blade 16 and to temporarily secure the blade to the workpiece while a measurement is being taken. As can be appreciated from FIG. 10, the leg sections 162 extend beyond the longitudinally extending edges of the blade 16 to provide a side catch surface on each side of the blade that 16 can be used to hook the blade to an object or workpiece. The side catch structure provided by the legs 162 can function to secure the free end of the blade 16 during a measurement. The side catch structure provided by the leg sections 162 also allow the blade 16 to be easily and steadily held in a tilted position relative to a surface of the workpiece, thereby allowing a longitudinally extending edge of the blade 16 to be held against the workpiece. More specifically, when the convex side of the blade 16 is against the workpiece, the longitudinal edges are normally spaced from the surface because of the concavo-convex cross-section of the blade 16. The legs 162 of the hook member 34 provide a side catch that can be hooked over an edge of the workpiece to allow the user to hold steadily a longitudinal edge of the blade very close to or directly against the workpiece when the convex side of the blade 16 is against the workpiece, which facilitates reading a measurement.

The upper portions of the leg sections 162 extend generally upwardly and outwardly above the concave side of the blade 16 (FIG. 10) to provide structure above the concave surface of the blade 16 to hookingly engage the workpiece to facilitate extension of the blade 16 and to hold the free end of the blade 16 while a measurement is being read. For example, the blade 16 can be placed against a workpiece such that the concave side of the blade 16 is facing the workpiece and such that the opposite longitudinal edges of the blade 16 abut a surface on the workpiece at a point where they measurement is to be read. When the blade 16 is in this position, the upwardly extending portions of the legs 162 on the hook member 34 can be used to hold the free end 20 of the blade 16 against the workpiece.

It can also be appreciated from FIGS. 2 and 3 that the hook-shaped portion 152 of the hook member 34 provides an aesthetically pleasing "face" appearance on the front of the rule assembly 10 when the blade 16 is in the fully retracted position. Transversely spaced corners 171 on the free end 20 of the blade 16 are mitered (FIG. 5) inwardly from opposite longitudinal edges of the blade 16; the leg sections 162 of the hook member 34 extend beyond the mitered comers 171 on the opposite edges of the end 20 of the blade 16. The mitered comers 171 prevent the user from being scratched or cut by the comers on the end of blade 16. Preferably, each comer 171 is mitered inwardly from the respective opposite longitudinal edge starting at a distance of approximately 3/32 of an inch from the free end of the blade 16.

The construction disclosed for the hook member 34 is provided for illustrative purposes only and is not intended to be limiting. Any suitable construction or configuration may be used.

Figure 10:
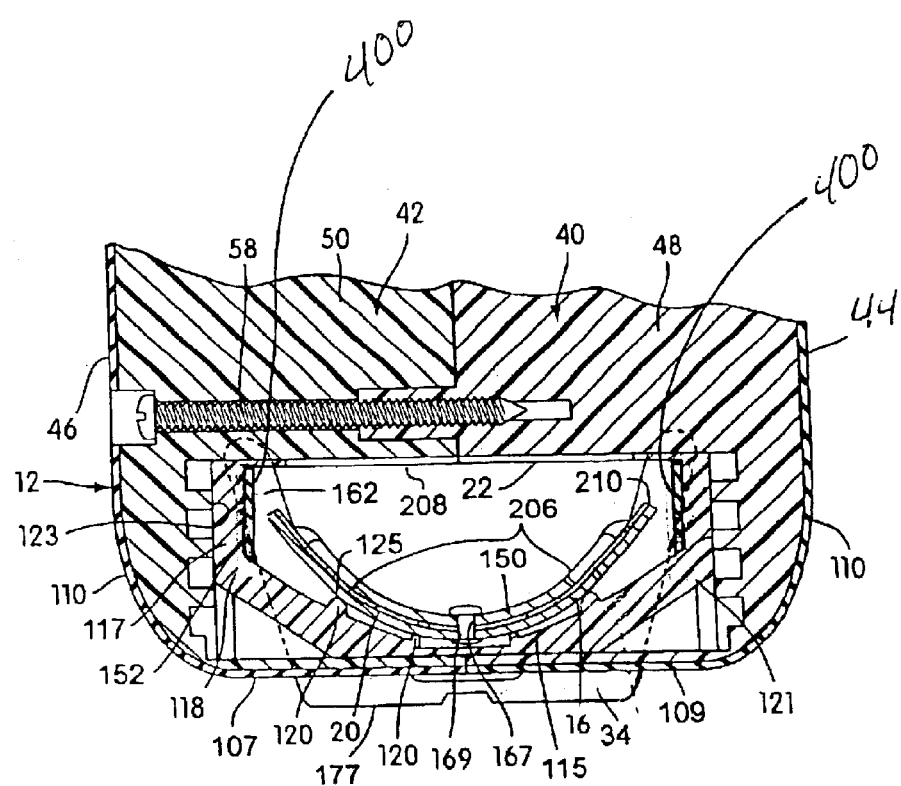
FIG. 10 is a partial cross-sectional view taken along lines 10—10 of FIG. 7.

Preferably, the blade opening 22 has a height dimension that exceeds the height dimension of the hook member mounting portion 150 and its connection with the free end of the blade 16 by an amount which is at least approximately equal to the amount the hook portion 152 of the hook member 34 extends below a bottom end surface 170 of the housing assembly 12 at the blade opening 22 when the hook member 34 is at the housing opening 22 (FIG. 10). This height of the opening 22 is provided to prevent possible damage to the hook member 34 when the blade 16 is fully retracted and the hook member 34 is impacted (by dropping or the like) in a direction that tends to move the hook member 34 upwardly with respect to the opening 22.

The details of the construction of the blade opening 22 can be appreciated from FIGS. 5 and 10. The axially extending fastener 58 in the comer 96 must be spaced upwardly in the housing assembly 12 a sufficient distance to allow the opening 22 to have sufficient height to protect the hook member during impact. The location of this fastener 58 in the comer 96 is restricted by the dimensions of the comer 96. Specifically, the arcuate path followed by the arcuate holding member 126 between its inoperative position and its blade holding position defines the interior extent of the bottom comer 96 of the housing assembly and a lower front wall portion 200 at the front of the housing assembly 12 generally defines the forward extent of the bottom comer 96. Thus, it can be appreciated from FIG. 5 that the tape rule assembly 10 is constructed so that the holding member 126 and the front wall portion 200 cooperate to allow the fastener 58 to be positioned upwardly relative to the housing assembly 12 sufficiently to allow the housing opening 22 to have the height as aforesaid. The lower front wall portion 200 of the housing assembly is essentially flush with the central portion 204 of the front of the housing assembly. By positioning the lower front wall portion 200 essentially flush with the central front wall portion 204, the associated axially extending fastener 58 can be located sufficiently upwardly to allow the blade opening 22 to have a height as recited sufficient to protect the hook member in the event of impact. Specifically, the increased blade opening height allows the bottom edge 177 to move upwardly to a position flush with the bottom surface 170 of the housing assembly 12 adjacent the opening 22 before the mounting portion 150 of the hook member 34 impacts any downwardly facing surfaces on the housing assembly 12.

It can be appreciated from FIG. 4 that in the exemplary embodiment of the tape assembly 10, the interior free end 128 of the holding member 126 is disposed generally above the mounting portion 150 of the hook member 34 when the hook member 34 is at the opening 22. The recess 129 is provided in the free end 128 of the holding member 126 so that if the hook member 34 is caused to move upwardly in the opening 22 because of an impact, the free end 128 of the holding member 126 does not prevent upward movement of the hook member 34 in the opening 22 so that the bottom edge 177 can move upwardly to a position flush with exterior housing assembly 12 bottom end surface 170. More particularly, the central recess 129 is of a width to operatively accommodate the width of the hook member mounting portion 150. Therefore, when the hook member 34 is forced upwardly in housing opening 22 by an impact, the mounting portion 150 moves upwardly into the recess 129, thereby allowing the bottom edge 177 of the hook member 34 to move upwardly sufficiently so that it is flush with the bottom end surface 170 of the housing assembly adjacent the opening 22. If the recess 129 were not provided, the free end 128 of the holding member 126 could possibly restrict the upward movement of the mounting portion 150 so that an impact on the hook portion 152 of the holding member 34 could bend of the hook member 34 against the holding member 126. The recess 129 precludes the possibility of this type of damage to the hook member 34 by allowing the holding member 34 to move upwardly in the housing assembly opening 22 at least far enough to allow the bottom edge 177 to move flush with the surface 170 at the bottom end of the housing assembly 12.

The opening 22 is constructed to allow the hook member 34 to move upwardly in the opening 22 until the upper edges of the mounting portion 150 impacts structure at the top of the opening 22. More specifically, it can be appreciated from FIGS. 5 and 10 that the lateral edges of the mounting portion 150 adjacent the hook portion 152 provide upwardly facing surfaces 206 which engage one or more downwardly facing surfaces 208 defining the housing opening 22 to limit the upward movement of the hook member 34 within the opening 22. The lateral longitudinally extending edges 210 of the blade 16 extend upwardly and outwardly beyond the upwardly facing surfaces 206 of the hook member mounting portion 150, but the edges 210 do not limit the upward movement of the hook member 34 in the opening 22. This is because when the hook member 34 moves upwardly in the opening 22 during impact, the edges 210 of the blade 16 engage the downwardly facing housing opening surfaces 208 and deflect resiliently outwardly before the mounting portion 150 of the hook member 34 engages of the upwardly facing surfaces 206. In other words, in the exemplary embodiment of the tape assembly 10 shown, the concavo-convex cross sectional curve height of the blade 16 is such that the edges 210 are normally above the upwardly facing surfaces 206 on the mounting structure 150 of the hook member 34. When the hook member 34 at the opening 22 is moved upwardly with respect to the blade opening 22 by an impact, the edges 210 of the blade 16 impact the upper portion of the opening 22 first, causing the edges 210 of the blade to flex outwardly in opposite directions, slightly flattening the blade 16 to a degree sufficient to allow the mounting portion 150 of the hook member 34 to move toward and into contact with the downwardly facing surfaces 208 at housing opening 22. When the upwardly facing surfaces 206 on a mounting portion abut the downwardly facing surfaces 208 at the opening 22, the hook member 34 reaches the upper limiting position of its upward movement in the housing opening. This upper limiting position is usually not reached, however, because preferably the tape assembly 10 is constructed and arranged such that the bottom edge 177 of the hook member 34 moves upwardly to a position flush with the surface 170 on the bottom of the housing assembly 12 before the upwardly facing surfaces 206 on the hook member 34 impact the downwardly facing surfaces 208 on the housing assembly 12. When the bottom end 177 of the hook member 34 is flush with the bottom end surface 170 of the housing assembly, the hook member 34 is protected with further impact, thereby preventing damage to the hook member 34.

The construction of the blade opening 22 and the portions of the housing associated therewith are disclosed only for illustrative purposes and are not to be considered limiting. Any suitable construction or configuration may be used.

Figure 15:
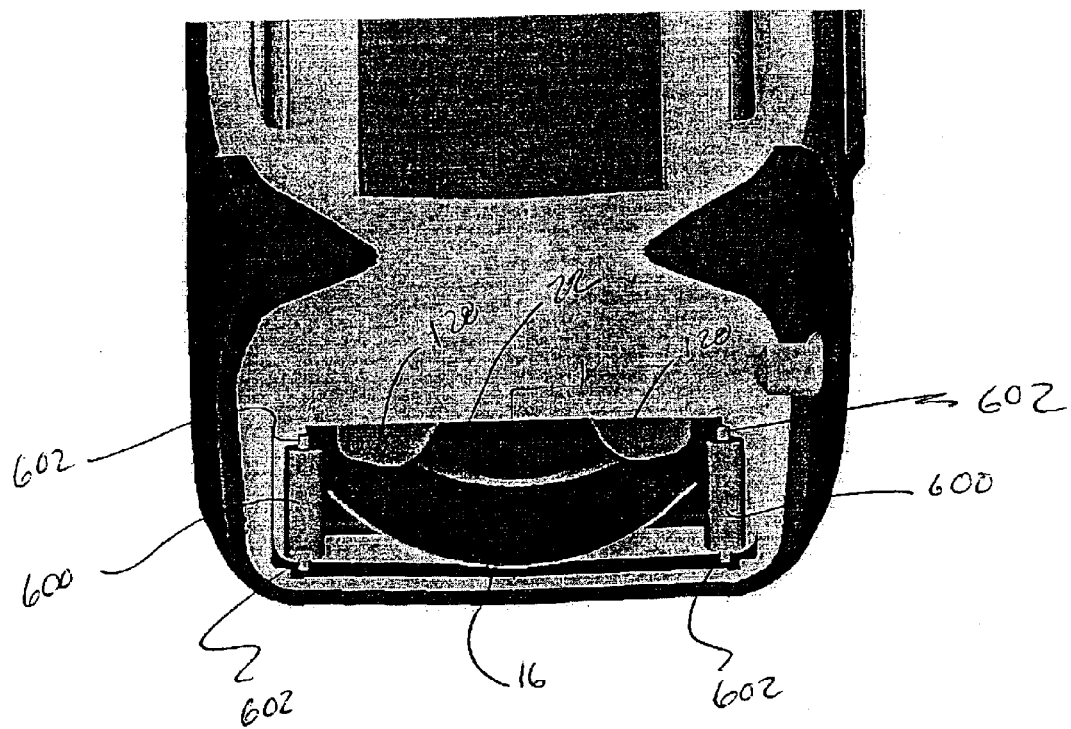
FIG. 15 is a front elevated view of a second alternative rule assembly.

FIG. 15 shows an alternative embodiment wherein a pair of rollers 600 are rotatably mounted by axles 602 to the upstanding arms 117 of the insert 118 (the insert 118 is not shown so the rollers 600 can be clearly seen). Specifically, the arms 117 have recesses (not shown) formed on upper and lower parts thereof and the rollers 600 have the upper and lower axles 602 received in those recesses to rotatably mount the rollers 600. As the blade 16 is retracted/extended relative to the opening 22, lateral side edges of the blade 16 may engage and rotate the rollers 600. This substantially protects the lateral sides of the blade opening 22 from wear, as the rotation of the rollers 600 prevents high friction from being created, which could cause the blade edges to wear into the rollers 600.

The rollers 600 may be made of a wear resistant material, such as a metal, or a plastics material substantially harder than the material of the housing, or have a plastic body with a wear resistant, preferably metal, coating. The rollers 600 may have various shapes and the illustrated shape is cylindrical.

Instead of being mounted to an insert 118, the rollers 600 may be mounted directly to the main housing portion at the lateral sides of the blade opening. Also, laterally oriented rollers may likewise be mounted at the upper and/or lower sides of the blade opening 22 to minimize any wear in those regions.

The present invention may be applied to any tape rule assembly, including, but not limited to those disclosed in U.S. Patent Application Nos. 2002/0029489, 2002/0078585, and U.S. Pat. Nos. 6,367,161, 6,449,866, 6,202,511, 6,324,769, 6,282,808, 6,243,964, and 6,249,986. These patents and patent applications are hereby incorporated into the present application by reference.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A retractable rule assembly comprising:
    a housing having a blade opening, the blade opening having two lateral sides provided by a plastics material having a hardness;
    a reel rotatably mounted in the housing;
    an elongated blade formed of a ribbon of metal having a pair of opposing lateral side edges, the blade being wound on the reel, the blade being extendable outwardly through the blade opening with the lateral side edges thereof adjacent the lateral sides of the opening, the blade having a concavo-convex cross-sectional configuration when extended from the housing and having measuring indicia on the concave side thereof;
    a spring constructed to rotate the reel in the housing in a direction to wind up the elongated blade onto the reel in a flattened cross-sectional configuration; and
    wear resistant structure comprising a wear resistant material having a hardness greater than the hardness of the plastics material, the wear resistant structure being located at least at each of the lateral sides of the blade opening to substantially protect the plastics material at the lateral sides of the opening from wear by the lateral side edges of the blade,
    wherein the wear resistant structure is fixedly mounted upon the housing to prevent said wear resistant structure from movement away from the blade opening.

2. A retractable rule assembly according to claim 1, wherein the wear resistant material is a metal.

3. A retractable rule assembly according to claim 2, wherein the housing includes a main housing portion and wherein the housing further includes an insert including wear resistant structure, the insert being mounted to the main housing portion to define at least part of the blade opening.

4. A retractable rule assembly according to claim 3, wherein the lateral sides of the blade opening are provided by the main housing portion and formed from the plastics material.

5. A retractable rule assembly according to claim 3, wherein the lateral sides of the blade opening are provided by the insert and formed from the plastics material.

6. A retractable rule assembly according to claim 5, wherein the insert includes a main insert body portion and the wear resistant structure is mounted to the main insert body portion.

7. A retractable rule assembly according to claim 6, wherein the wear resistant structure is mounted to the main insert body portion by overmolding.

8. A retractable rule assembly according to claim 7, wherein the wear resistant structure is a single piece of metal having a first part at one of the lateral sides of the blade opening and a second part at the other of the lateral sides of the blade opening.

9. A retractable rule assembly according to claim 8, wherein the first and second parts of the wear resistant structure have plate-like configurations.

10. A retractable rule assembly according to claim 7, wherein the wear resistant structure is two pieces of metal, one piece of metal being mounted at one of the lateral sides of the blade opening and the other piece of metal being mounted at the other of the lateral sides of the blade opening.

11. A retractable rule assembly according to claim 3, wherein the entire insert is formed from said wear resistant material.

12. A retractable rule assembly according to claim 1, wherein the wear resistant material is another plastics material.

13. A retractable rule assembly according to claim 1, wherein the wear resistant structure is provided by rollers rotatably mounted at least at each of the lateral sides of the blade opening.

14. A retractable rule assembly comprising:
    a housing having a blade opening, the blade opening having two lateral sides provided by a plastics material;
    a reel rotatably mounted in the housing;
    an elongated blade formed of a ribbon of metal a pair of opposing lateral side edges, the blade being wound on the reel, the blade being extendable outwardly through the blade opening with the lateral side edges thereof adjacent the lateral sides of the opening, the blade having a concavo-convex cross-sectional configuration when extended from the housing and having measuring indicia on the concave side thereof;
    a spring constructed to rotate the reel in the housing in a direction to wind up the elongated blade onto the reel in a flattened cross-sectional configuration; and wear resistant structure comprising metal, the wear resistant structure being located at least at each of the lateral sides of the blade opening to substantially protect the plastics material at the lateral side edges of the opening from wear by the lateral side edges of the blade;

wherein the wear resistant structure is fixedly mounted upon the housing to prevent said wear resistant structure from movement away from the blade opening.

15. A retractable rule assembly according to claim 14, wherein the housing includes a main housing portion and wherein the housing further includes an insert including the wear resistant structure, the insert being mounted to the main housing portion to define at least part of the blade opening.

16. A retractable rule assembly according to claim 15, wherein the lateral sides of the blade opening are provided by the main housing portion and formed from the plastics material.

17. A retractable rule assembly according to claim 15, wherein the lateral sides of the blade opening are provided by the insert and formed from the plastics material.

18. A retractable rule assembly according to claim 17, wherein the insert includes a main insert body portion and the wear resistant structure is mounted to the main insert body portion.

19. A retractable rule assembly according to claim 18, wherein the wear resistant structure is mounted to the main insert body portion by overmolding.

20. A retractable rule assembly according to claim 19, wherein the wear resistant structure is a single piece of metal having a first part at one of the lateral sides of the blade opening and a second part at the other of the lateral sides of the blade opening.

21. A retractable rule assembly according to claim 20, wherein the first and second parts of the wear resistant structure have plate-like configurations.

22. A retractable rule assembly according to claim 19, wherein the wear resistant structure is two pieces of metal, one piece of metal being mounted at one of the lateral side edges of the blade opening and the other piece of metal being mounted at the other of the lateral side edges of the blade opening.

23. A retractable rule assembly according to claim 15, wherein said entire insert is formed from the metal.

24. A retractable rule assembly according to claim 14, wherein the wear resistant structure is provided by rollers rotatable mounted at least at each of the lateral sides of the blade opening.

25. A retractable rule assembly comprising:

a housing having a blade opening, the blade opening having two lateral sides provided by a plastics material having a hardness;

a reel rotatably mounted in the housing;

an elongated blade formed of a ribbon of metal having a pair of opposing lateral side edges, the blade being wound on the reel, the blade being extendable outwardly through the blade opening with the lateral side edges thereof adjacent the lateral sides of the opening, the blade having a concavo-convex cross-sectional configuration when extended from the housing and having measuring indicia on the concave side thereof;

a spring constructed to rotate the reel in the housing in a direction to wind up the elongated blade onto the reel in a flattened cross-sectional configuration; and wear resistant structure comprising a wear resistant material having a hardness greater than the hardness of the plastics material, the wear resistant structure including portions extending inwardly into the blade opening at the lateral sides thereof to substantially protect the plastics material at the lateral sides of the opening from wear by the lateral side edges of the blade.

26. A retractable rule assembly comprising:

a housing having a blade opening, the blade opening having two lateral sides provided by a plastics material;

a reel rotatably mounted in the housing;

an elongated blade formed of a ribbon of metal having a pair of opposing lateral side edges, the blade being wound on the reel, the blade being extendable outwardly through the blade opening with the lateral side edges thereof adjacent the lateral sides of the opening, the blade having a concavo-convex cross-sectional configuration when extended from the housing and having measuring indicia on the concave side thereof;

a spring constructed to rotate the reel in the housing in a direction to wind up the elongated blade onto the reel in a flattened cross-sectional configuration; and wear resistant structure comprising metal, the wear resistant structure being located at least at each of the lateral sides of the blade opening to substantially protect the plastics material at the lateral side edges of the opening from wear by the lateral side edges of the blade;

wherein the housing includes a main housing portion and wherein the housing further includes an insert including the wear resistant structure, the insert being mounted to the main housing portion to define at least part of the blade opening;

wherein the lateral sides of the blade opening are provided by the insert and formed from the plastics material;

wherein the insert includes a main insert body portion and the wear resistant structure is mounted to the main insert body portion;

wherein the wear resistant structure is mounted to the main insert body portion by overmolding;

wherein the wear resistant structure is two pieces of metal, one piece of metal being mounted at one of the lateral side edges of the blade opening and the other piece of metal being mounted at the other of the lateral side edges of the blade opening.

27. A retractable rule assembly comprising:

a housing having a blade opening, the blade opening having two lateral sides provided by a plastics material;

a reel rotatably mounted in the housing;

an elongated blade formed of a ribbon of metal having a pair of opposing lateral side edges, the blade being wound on the reel, the blade being extendable outwardly through the blade opening with the lateral side edges thereof adjacent the lateral sides of the opening, the blade having a concavo-convex cross-sectional configuration when extended from the housing and having measuring indicia on the concave side thereof;

a spring constructed to rotate the reel in the housing in a direction to wind up the elongated blade onto the reel in a flattened cross-sectional configuration; and wear resistant structure comprising metal, the wear resistant structure being located at least at each of the lateral sides of the blade opening to substantially protect the plastics material at the lateral side edges of the opening from wear by the lateral side edges of the blade, wherein the wear resistant structure is fixedly mounted against movement away from the blade opening;

wherein the housing includes a main housing portion and wherein the housing further includes an insert including the wear resistant structure, the insert being mounted to the main housing portion to define at least part of the blade opening;

wherein the lateral sides of the blade opening are provided by the insert and formed from the plastics material;

wherein the insert includes a main insert body portion and the wear resistant structure is mounted to the main insert body portion;

wherein the wear resistant structure is mounted to the main insert body portion by overmolding;

wherein the wear resistant structure is two pieces of metal, one piece of metal being mounted at one of the lateral side edges of the blade opening and the other piece of metal being mounted at the other of the lateral side edges of the blade opening.

* * * * *